(12) United States Patent
Waymire et al.

(10) Patent No.: US 11,485,031 B2
(45) Date of Patent: Nov. 1, 2022

(54) HERB-STRIPPING DEVICES, ASSEMBLIES, AND COMPONENTS

(71) Applicants: Katherine Waymire, Minneapolis, MN (US); Melessa E. Paynter, St. Michael, MN (US)

(72) Inventors: Katherine Waymire, Minneapolis, MN (US); Melessa E. Paynter, St. Michael, MN (US)

(*) Notice: Subject to any disclaimer, the term of this patent is extended or adjusted under 35 U.S.C. 154(b) by 0 days.

(21) Appl. No.: 15/912,987

(22) Filed: Mar. 6, 2018

(65) Prior Publication Data

US 2018/0194020 A1 Jul. 12, 2018

Related U.S. Application Data

(63) Continuation of application No. 15/063,500, filed on Mar. 7, 2016, now abandoned.

(60) Provisional application No. 62/129,609, filed on Mar. 6, 2015.

(51) Int. Cl.
| | |
|---|---|
| *B26B 11/00* | (2006.01) |
| *A47J 17/00* | (2006.01) |
| *B26B 13/12* | (2006.01) |
| *B26B 1/02* | (2006.01) |

(52) U.S. Cl.
CPC .......... *B26B 11/006* (2013.01); *A47J 17/00* (2013.01); *B26B 1/02* (2013.01); *B26B 13/12* (2013.01)

(58) Field of Classification Search
CPC ........ B26B 11/006; B26B 1/02; B26B 13/12; A47J 17/00

USPC .......... 30/90.1, 90.4, 90.6, 90.7, 90.8, 91.1, 30/91.2, 351, 355; 7/110, 113; 81/9.4, 81/9.43, 9.44
See application file for complete search history.

(56) References Cited

U.S. PATENT DOCUMENTS

| | | | | |
|---|---|---|---|---|
| RE6,012 E | * | 8/1874 | Taft | 7/113 |
| 342,884 A | * | 6/1886 | Stone | B26B 11/00 7/158 |
| 386,183 A | * | 7/1888 | Brooks | B26B 9/02 30/355 |
| 529,488 A | * | 11/1894 | Gile | B25B 7/22 7/131 |
| 653,019 A | * | 7/1900 | Faxon | A01B 1/12 172/380 |
| 1,040,138 A | * | 10/1912 | Buck | A22C 25/006 30/144 |
| 1,497,577 A | * | 6/1924 | Morzsa | B23D 49/11 125/15 |

(Continued)

*Primary Examiner* — Anthony J Weier
(74) *Attorney, Agent, or Firm* — Ference & Associates LLC

(57) ABSTRACT

Conventional herb strippers can be tedious, time consuming, and awkward to use. Accordingly, the present inventors devised new tools and methods that allow faster and easier herb stripping. One tool includes an herb stripping notch configured to engage the plant stem of an herb at an intermediate point between its two ends, with the edges of the notch stripping leaves as the notch is moved over the stem or the stem is pulled through the notch. In some embodiments, one or more of these notches, for example six, are included in a blade structure, with the notches arranged in a smallest-to-largest sequence. The blade structure may also includes a knife edge, enabling it to serve the added function of a knife.

18 Claims, 4 Drawing Sheets

(56) References Cited

U.S. PATENT DOCUMENTS

| | | | | |
|---|---|---|---|---|
| 1,710,039 A * | 4/1929 | Bauer | A01B 1/12 | 172/380 |
| 2,126,080 A * | 8/1938 | Backer | A47J 17/02 | 30/353 |
| 2,132,320 A * | 10/1938 | Quinn | A47J 17/02 | 30/142 |
| 2,178,028 A * | 10/1939 | Adamec | A47J 17/02 | 30/279.2 |
| 2,274,188 A * | 2/1942 | Campbell | B26B 3/00 | 30/165 |
| D137,168 S * | 2/1944 | Jacobson | D15/126 | |
| D152,727 S * | 2/1949 | Peterson | 30/279.2 | |
| D155,412 S * | 10/1949 | Gerson | 30/299 | |
| 2,503,961 A * | 4/1950 | Meunier | A22C 21/024 | 119/631 |
| 2,630,314 A * | 3/1953 | Cadwallader | B26B 11/006 | 177/129 |
| 2,685,131 A * | 8/1954 | Seeberger | B26B 9/02 | 30/355 |
| 2,685,734 A * | 8/1954 | Klein | A22B 5/0047 | 30/144 |
| 2,750,669 A * | 6/1956 | Hohmann | B26B 9/00 | 30/355 |
| 2,799,930 A * | 7/1957 | Champlin | B26B 9/02 | 30/355 |
| 2,806,325 A * | 9/1957 | Fox | A01G 5/00 | 47/1.01 R |
| 2,973,578 A * | 3/1961 | Carroll | B26B 9/02 | 30/355 |
| 3,121,951 A * | 2/1964 | Green | A47G 21/02 | 30/149 |
| 3,673,685 A * | 7/1972 | Eppolito | A63B 37/0002 | 15/105 |
| 4,081,871 A * | 4/1978 | Knuth | H02G 1/1295 | 7/107 |
| 4,189,799 A * | 2/1980 | Litehizer, Jr. | H02G 1/1229 | 30/90.6 |
| 4,759,126 A * | 7/1988 | McCoy | A22C 29/024 | 30/120.1 |
| 4,799,406 A * | 1/1989 | Diaz-De-Guerenu-Aguirrebeitia | H02G 1/1224 | 30/90.1 |
| 4,817,221 A * | 4/1989 | Ryan | B26B 27/00 | 30/298 |
| 4,958,395 A * | 9/1990 | Busskohl | B23D 61/121 | 30/144 |
| 5,060,329 A * | 10/1991 | Hudson | H02G 1/1214 | 7/129 |
| 5,062,238 A * | 11/1991 | Smith | A01G 5/00 | 47/1.01 R |
| 5,081,770 A * | 1/1992 | Fierthaler | B26B 9/02 | 30/351 |
| 5,175,984 A * | 1/1993 | Hale | A01D 41/06 | 56/130 |
| 5,232,132 A * | 8/1993 | Broussard | A47F 13/04 | 223/44 |
| 5,421,090 A * | 6/1995 | Chiou | B26B 13/08 | 30/254 |
| 5,448,833 A * | 9/1995 | Coon | B23D 51/01 | 30/142 |
| 5,692,308 A * | 12/1997 | Di Libero | B26B 9/02 | 30/308 |
| 5,893,185 A * | 4/1999 | Okrepkie | B25F 1/006 | 7/164 |
| 5,894,617 A * | 4/1999 | Liou | B25B 7/22 | 7/107 |
| 6,578,273 B1 * | 6/2003 | Eickhorn | B26B 9/00 | 30/355 |
| 6,829,973 B1 * | 12/2004 | Yang | B23D 61/021 | 30/166.3 |
| 7,665,389 B2 * | 2/2010 | Frazer | B25F 1/04 | 7/128 |
| D618,075 S * | 6/2010 | Huang | D8/20 | |
| 8,074,536 B1 * | 12/2011 | Allen | B26B 13/06 | 30/90.6 |
| 8,393,083 B2 * | 3/2013 | Wu | B26B 13/28 | 30/195 |
| 8,707,490 B1 * | 4/2014 | Pelton | B26B 1/00 | 30/123 |
| 8,875,611 B2 * | 11/2014 | Mann | B23D 61/006 | 30/339 |
| 2003/0150062 A1 * | 8/2003 | Muirhead | B25B 7/02 | 7/108 |
| 2004/0158995 A1 * | 8/2004 | Dunn-Rankin | B26B 9/02 | 30/355 |
| 2004/0187314 A1 * | 9/2004 | Johnson | B26B 5/00 | 30/162 |
| 2007/0067996 A1 * | 3/2007 | Chang | H02G 1/1229 | 30/90.1 |
| 2007/0157476 A1 * | 7/2007 | Hunt | A47L 13/08 | 30/355 |
| 2008/0047149 A1 * | 2/2008 | Webb | A47J 17/02 | 30/278 |
| 2008/0271257 A1 * | 11/2008 | Frazer | B26B 1/042 | 7/158 |
| 2008/0271258 A1 * | 11/2008 | Frazer | B26B 1/042 | 7/158 |
| 2009/0255135 A1 * | 10/2009 | Diaz | B26B 3/00 | 30/355 |
| 2010/0085739 A1 * | 4/2010 | Webb | B26B 1/02 | 362/157 |
| 2010/0095463 A1 * | 4/2010 | Yang | B21D 39/04 | 7/107 |
| 2010/0101095 A1 * | 4/2010 | Prasetya | B26B 11/006 | 30/123 |
| 2010/0101100 A1 * | 4/2010 | Hansen | B26B 3/00 | 30/355 |
| 2010/0287779 A1 * | 11/2010 | Wilson | B26B 9/00 | 30/122 |
| 2011/0072593 A1 * | 3/2011 | Battenfeld | B25B 7/22 | 7/107 |
| 2012/0297548 A1 * | 11/2012 | Solari | A47J 43/283 | 7/113 |
| 2012/0304393 A1 * | 12/2012 | Seemangal | B25B 7/02 | 7/107 |
| 2013/0139324 A1 * | 6/2013 | Pelton | B26B 1/00 | 7/118 |
| 2013/0174351 A1 * | 7/2013 | Carson | B26B 9/00 | 7/118 |
| 2013/0205511 A1 * | 8/2013 | Dixon | B26B 3/06 | 7/144 |
| 2013/0326884 A1 * | 12/2013 | Harvey | B26B 1/042 | 30/161 |
| 2014/0192519 A1 * | 7/2014 | Rubin | B26B 11/00 | 362/116 |
| 2014/0345147 A1 * | 11/2014 | Frazer | B26B 5/00 | 30/336 |
| 2016/0036207 A1 * | 2/2016 | Burris | H02G 1/1224 | 30/91.2 |
| 2016/0129600 A1 * | 5/2016 | Ryun | A47J 17/00 | 30/123 |
| 2016/0176034 A1 * | 6/2016 | Barr | B25F 1/00 | 7/113 |

* cited by examiner

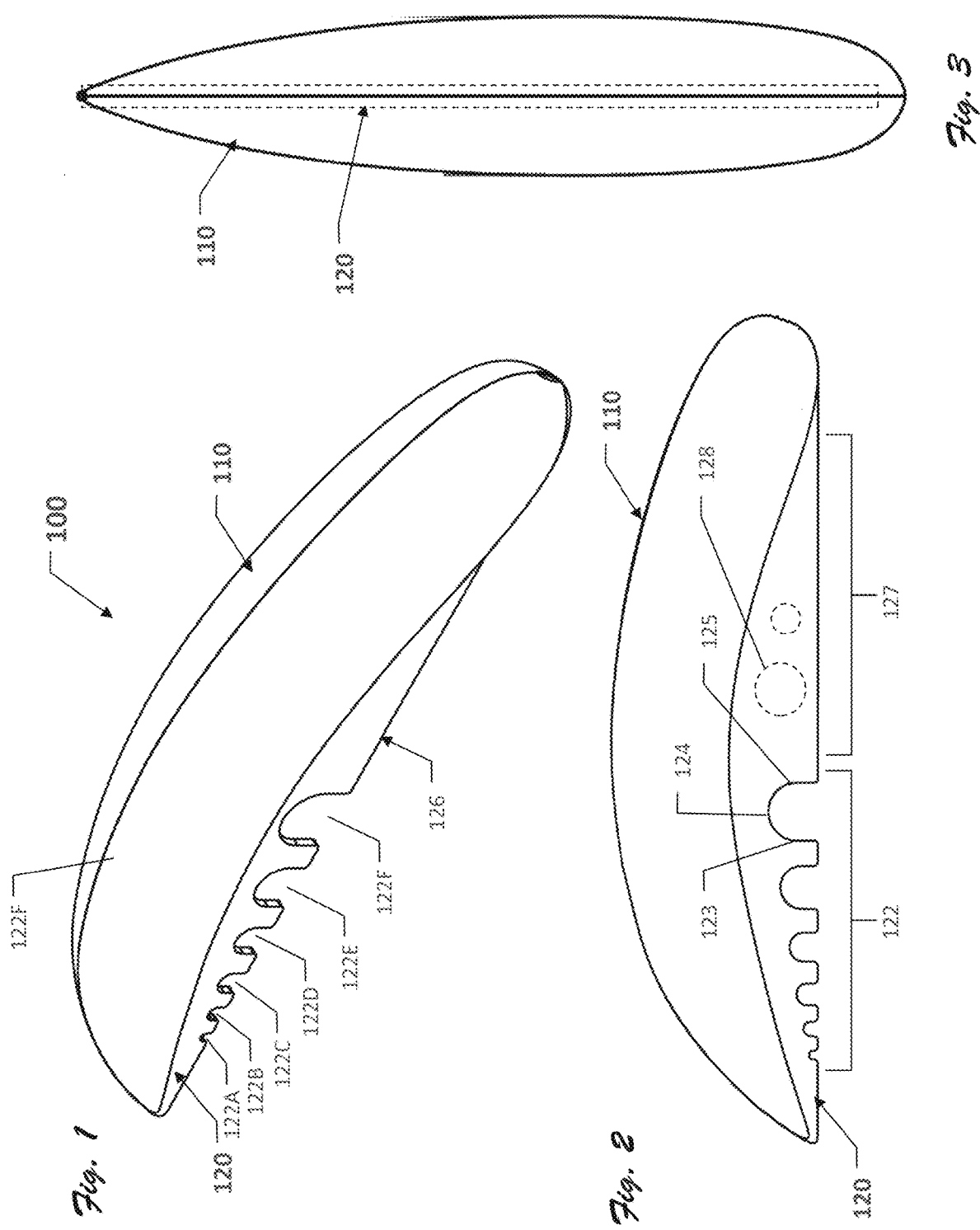

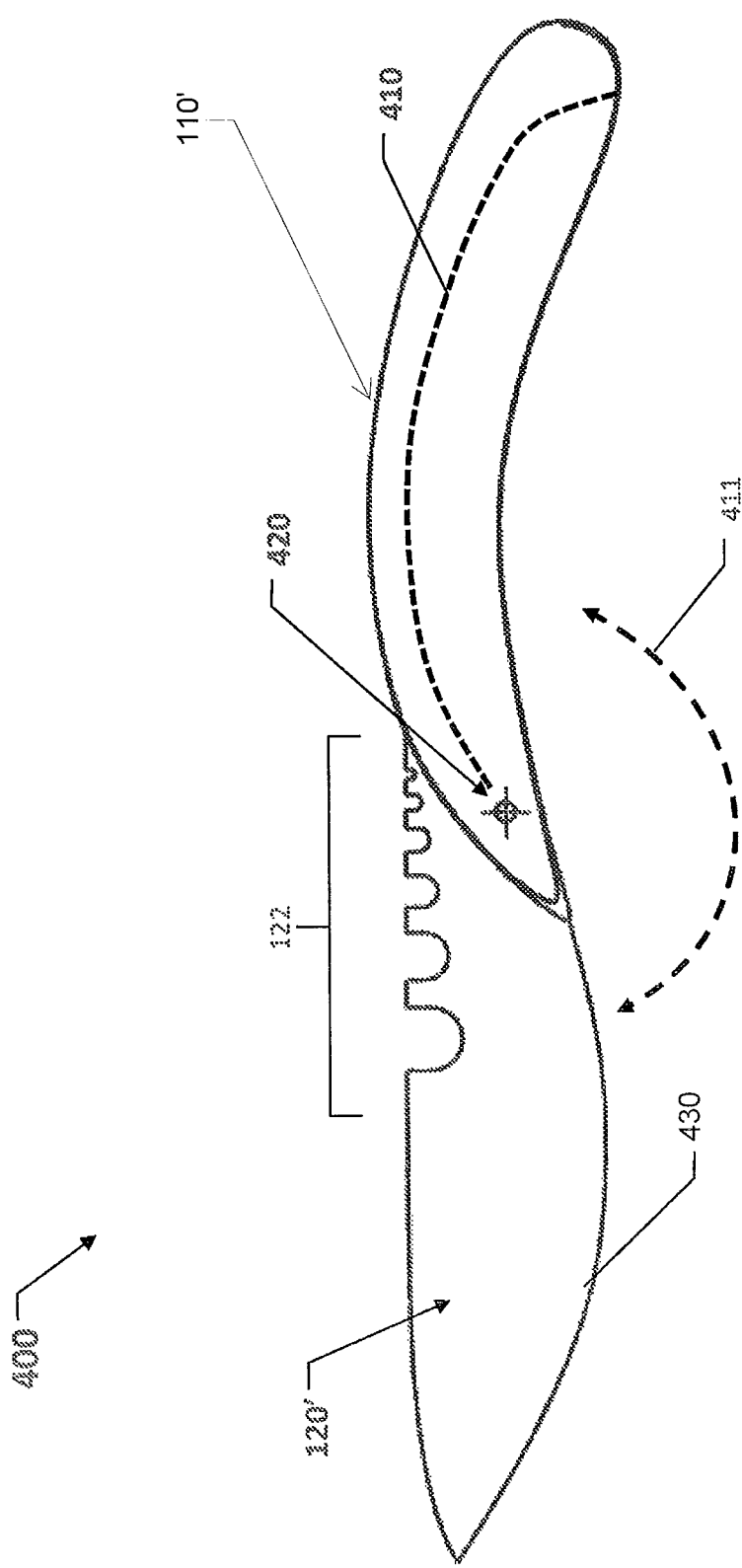

HERB-STRIPPING DEVICES, ASSEMBLIES, AND COMPONENTS

RELATED APPLICATION

The present application is a continuation of U.S. patent application Ser. No. 15/063,500 filed Mar. 7, 2016, now abandoned, which itself claims priority to U.S. Provisional Patent Application 62/129,609, filed on Mar. 6, 2015. Both applications are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright© 2015, TALISMAN DESIGNS, LLC.

TECHNICAL FIELD

Various embodiments of the invention relate generally to herb-stripping devices and related methods.

BACKGROUND

Fresh herbs, such as thyme, rosemary, oregano, and tarragon, are vital ingredients in many types and forms of culinary delights. Because the stems of the herbs are typically difficult to digest or otherwise undesirable, chefs expend considerable time and energy removing the leaves by hand.

To save time, devices known as herb strippers have been developed. These devices typically have at least one hole that the user can pull an herb stem through, with the edges of the hole stripping off the leaves in the process. Various holes are provided to fit herb stems of differing diameters.

The present inventors have recognized that conventional herb strippers suffer from at least three problems or shortcomings. First, these strippers require users to try poking stem ends through various holes, until they find the one that fits, adding time to the stripping process. Second, some stem ends, for example those of kale, are often too large to fit through any of the provided holes, requiring users to spend even more time on the additional task of trimming these stems to fit the stripper. And third, many herb strippers force users to hold the stripper in midair with one hand as they pull an herb stem through with the other. This is awkward not only because of the pushing and pulling momentum generated in the stripping process, but also because stripped leaves are falling in the process. Moreover, if multiple passes are necessary to complete the stripping, the tedious threading and awkward pulling are repeated for each pass.

Accordingly, the present inventor has identified a need for a better way of stripping herbs and other plants.

SUMMARY

To address one or more of these and/or other needs or problems, the present inventor devised, among other things, one or more exemplary systems, kits, methods, devices, assemblies, and/or components related to making herb stripping faster and easier.

One exemplary embodiment includes an herb stripping tool incorporating a notch with edges configured to engage a portion of a leafy herb stem and to strip leaves off the stem using the edges of the notch as the stem and notch move relative each other. The notch, which can take a variety of shapes, for example U or V and allows engaging the stem at a suitable point along its length, not only eliminating not only the need to thread a stem through a hole, but also the need to trim the end of larger plant stems to fit through the hole.

In some embodiments, the herb-stripping tool includes a blade structure that includes a set of one or more notches, for example 6, arranged in a progressive smallest-to-largest sequence. In this form, the tool is used together with a flat work surface, such as a counter top or cutting board, with the set of notches oriented downward and the blade structure contacting the work surface. One of the notches is placed over a leafy plant stem that is held in place against the board, and the tool is moved along the length of the stem and against the work surface, shearing leaves off the stem in the process. In some embodiments, users may create the stripping or shearing effect by pulling the stem through the notch as the tool is held in position against the work surface. Notably, the use of downward oriented notches together with the flat work surface eliminates the awkwardness of conventional herb stripping that requires users to hold the stripping stool and the herb in midair and strip without the leverage and support of a work surface.

In some embodiments, the blade-like structure includes a non-working or notchless edge or side that is opposite to the notched side. In some of these embodiments, the notchless edge is attached to the handle, which for example may take an ergonomic and aesthetically pleasing banana configuration. And, in some embodiments, the notchless side of the blade-like structure is configured as a knife edge, and the blade-like structure folds into the handle. In some embodiments, a portion of the blade structure on the same side as the notches is sharpened to function as a knife.

BRIEF DESCRIPTION OF THE DRAWINGS

Various embodiments are described herein with reference to the following attached figures. These figures are annotated with reference numbers for various features and components, and these numbers are used in the following description as a teaching aid, with like numbers referring to the same or similar features and components.

FIG. 1 is a perspective view of an exemplary herb stripping tool, corresponding to one or more embodiments of the present invention;

FIG. 2 is a right (and left) side view of the FIG. 1 herb stripping tool, corresponding to one or more embodiments of the present invention;

FIG. 3 is a top view of the FIG. 1 herb stripping tool, corresponding to one or more embodiments of the present invention;

FIG. 4 is a profile view of an exemplary herb-stripper-knife combination corresponding to one or more embodiments of the present invention.

DESCRIPTION OF EXEMPLARY EMBODIMENT(S)

Figure 5:
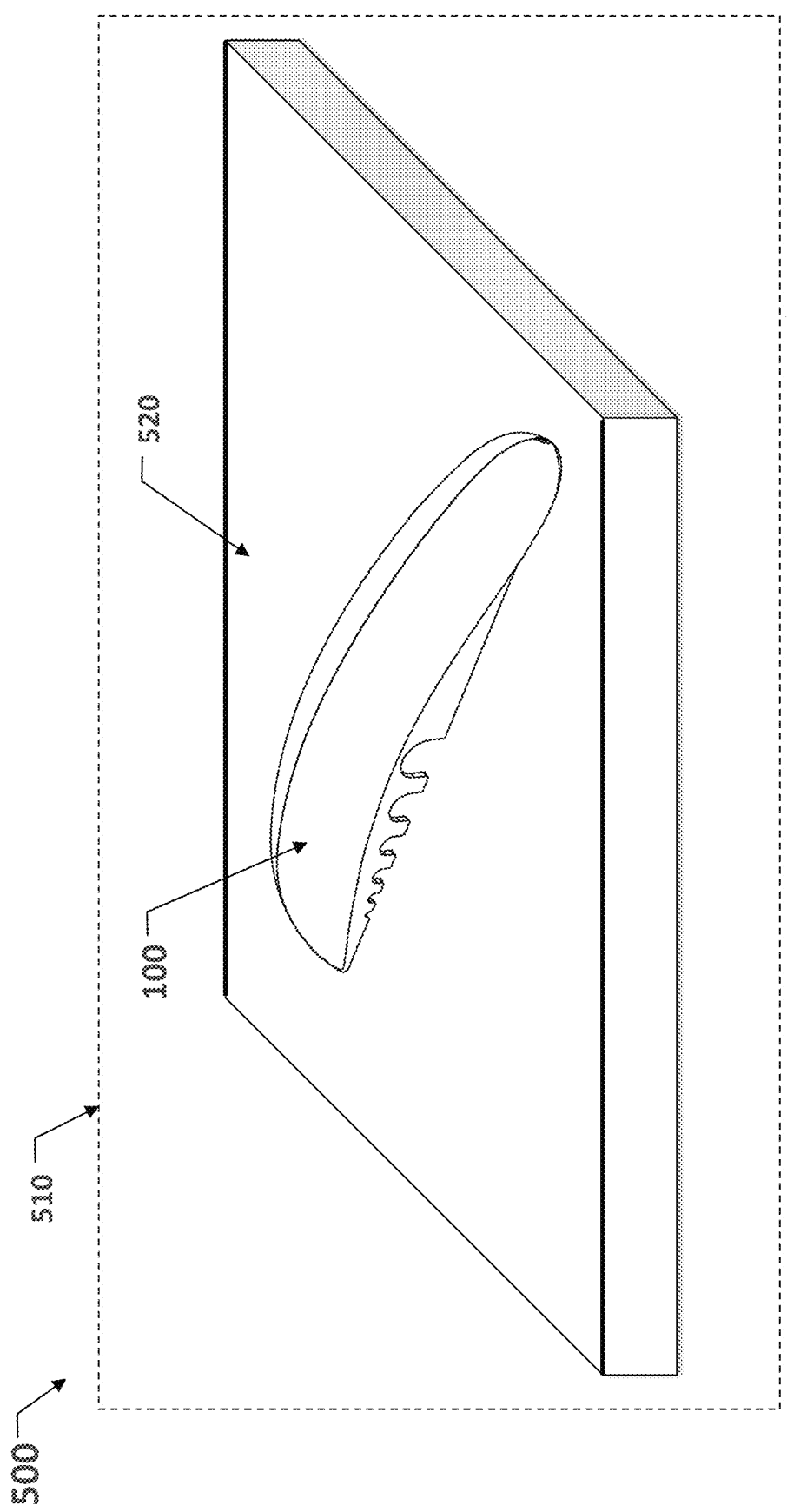
FIG. 5 is a prospective view of an exemplary herb stripping kit or assembly, corresponding to one or more embodiments of the present invention.

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

FIGS. 1, 2, 3 shows an exemplary herb stripper 100 that incorporates various teachings of the present invention. Herb stripper 100, which is formed of plastic, wood, metal, or combinations thereof using known fabrication techniques, such as injection molding, milling, and/or additive (3D) printing, includes a handle portion 110 and a blade-like structure 120.

Handle portion 110 takes a banana-like form that is ergonomic and aesthetically pleasing. Handle portion 110 is attached via adhesive, over molding, or integrally molded to blade-like portion 120. (Note that handle portion 120 is shown with a top seam in various figures; however, some embodiments omit this seam.)

Blade-like portion 120, has a length much greater, for example at least 5, 10, or 20 times greater than its width, includes a sequence of six notches 122, labeled individually as 122A-122F, which are progressively arranged in increasing size from smallest to largest in terms of area (length and width) along a generally flat and straight edge portion 126. Each notch includes a pair of opposing edge portions, of which edge portions 123 and 124 are representative, and a connecting edge portion 125 of which edge portion 125 is representative. The notches sizes are selected to allow placement of an appropriately selected one of the notches at an intermediate position along the length of a wide variety of herb stems. In the exemplary embodiment, edge portions 123 and 124 are substantially parallel to each other, with the connecting edge being rounded to define each notch a U-shape. However, the others shapes of notches are possible and the edge portions may be skewed, that is, non-parallel.

In exemplary operation, herb stripper 100 and herb stripper-knife 400 are used together with a flat work surface, such as a counter top or cutting board, with the set of notches oriented downward. One of the notches is placed over a leafy plant stem that is held in place against the board, and the blade structure is manually pressed into a slideable contact relationship with the work surface. The tool is moved along the length of the stem, maintaining contact with the work surface, shearing leaves off the stem in the process. In some embodiments, users may create the stripping or shearing effect by pulling the stem through the notch as the tool is held in position against the work surface. In some instances, a user may also move the stripper down the length of the plant stem, while simultaneously pulling the plant stem through the notch. Notably, the exemplary use of downward oriented notches together with the flat work surface eliminates the awkwardness of conventional herb stripping that requires users to hold the stripping stool and the herb in midair and strip without the support and stability of a work surface.

Note that in some embodiments all or a portion of the blade-like structure, for example notchless portion 127 may be shaped or sharpened to function as a knife. In some embodiments, blade-like structure 120 is made of hard plastic, stainless steel, or ceramic (zirconium oxide or zirconia), and handle portion 110 is made of hard plastic, wood, or silicone. Also, in some embodiments, blade-like portion 120 also includes one or more herb stripping holes 128, which are sized and used as according to the holes in conventional herb strippers.

FIG. 4 is a side view of an herb-stripper knife 400, which builds on the teachings of herb stripper 100 to include the added benefit of the blade-like structure folding out to function as a knife, with one end of the blade structure pivotably mounted to and storable in a blade slot on one side of the handle.

Specifically, knife 400 includes an alternative handle portion 110', an alternative blade-like structure 120', and a pivot pin 420. Handle portion 110' includes a blade slot or cavity 410 configured to receive a portion of blade-like structure 120' which is pivotally connected via pivot pin 420 to handle portion 110'. Blade-like structure 120', which pivots about pin 420 along path 411, includes a knife edge 430 opposite to notches 122. Knife edge 430 may take a variety of forms, for example straight edge or serrated. In some embodiments, all or a portion of knife edge 430 includes one or more additional notches to extend the available selection of herb stripping notches.

FIG. 5 shows a herb stripping cutting board kit 500, which further builds on teachings of the present invention. Specifically, kit 500 includes a package or container 510, which includes a wood, plastic, or composite wood-plastic cutting board 520 and a herb stripping device, such as herb stripper 100 or herb-stripper-knife 400.

Figure 6:
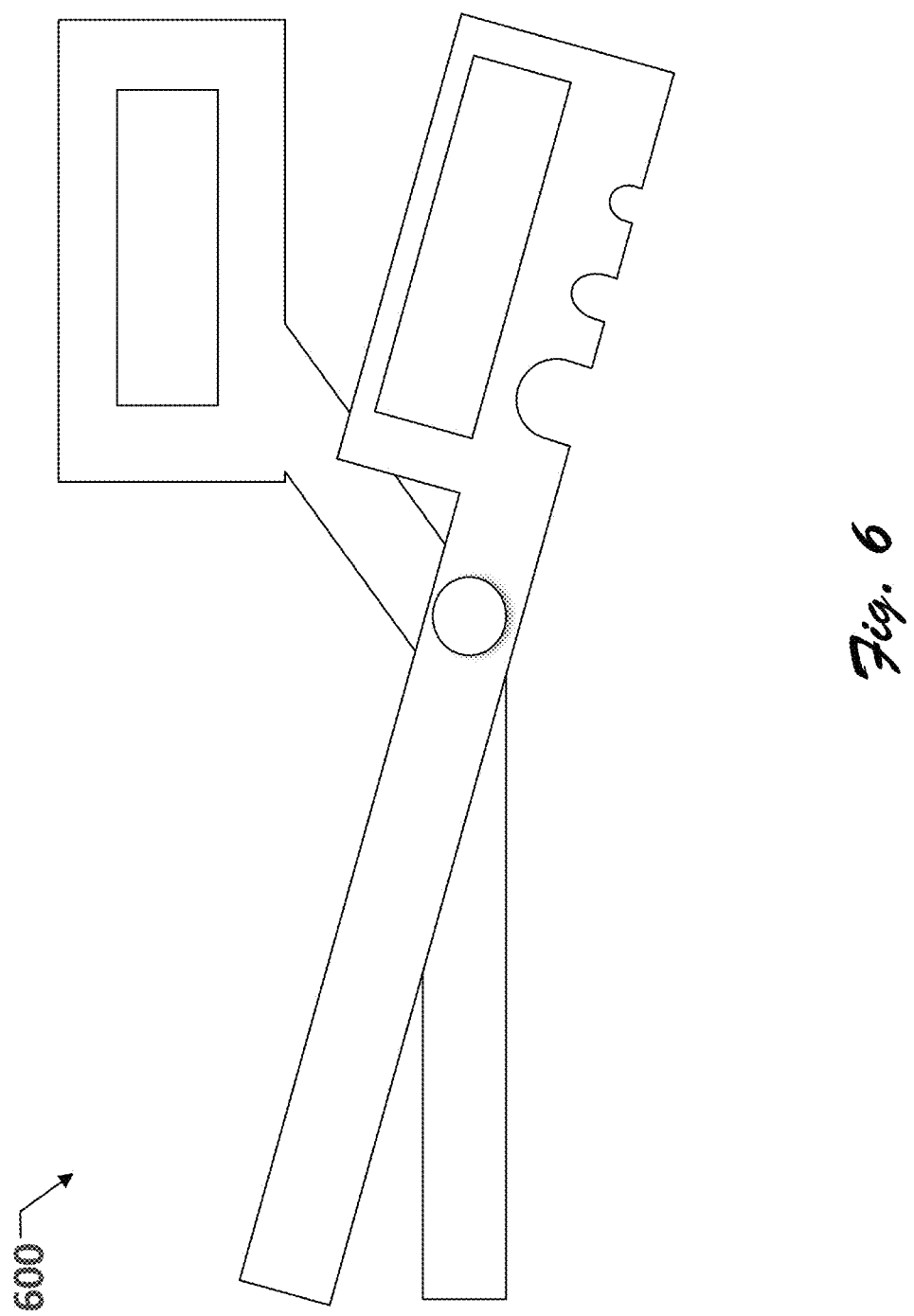
FIG. 6 is a side view of an exemplary herb-striper-scissor combination, corresponding to one or more embodiments of the present invention.

FIG. 6 shows a further extension of the teachings of the present invention in the form of kitchen shears 600, which include a handle portion having a set of one or more herb stripping notches. In some embodiments, one or more of the cutting blades include notches on a portion opposing the cutting edge.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. An herb stripping device comprising:
   a handle having a first end, a second end, a top surface extending between the first end and the second end, and a bottom surface extending between the first end and the second end; and
   a blade portion extending substantially between the first end of the handle and the second end of the handle, wherein a top edge of the blade portion contacts and is coupled to the bottom surface of the handle, and wherein a bottom edge of the blade portion comprises a plurality of curved notches, wherein each of the curved notches comprises a pair of opposing edge portions connected by a curved flat connecting edge portion for stripping herbs when an herb is moved through one of the plurality of curved notches, wherein the bottom edge of the blade portion, when in use, is positioned flat against a work surface.

2. The herb stripping device of claim 1, wherein the curved notches progressively increase in width along the blade portion.

3. The herb stripping device of claim 1, wherein the curved notches have varying heights.

4. The herb stripping device of claim 1, wherein the curved notches span less than half the blade portion.

5. The herb stripping device of claim 1, wherein at least a portion of the bottom edge of the blade portion is sharpened.

6. The herb stripping device of claim 5, wherein the curved notches span less than half the blade portion and wherein the at least a portion of the bottom edge of the blade portion being sharpened comprises a portion of the bottom edge of the blade portion not having the curved notches.

7. The herb stripping device of claim 1, wherein the top surface of the handle and the bottom surface of the handle meet at a point to form the first end of the handle.

8. The herb stripping device of claim 7, wherein the second end of the handle is formed by a curved sidewall connecting the top surface and the bottom surface, and the height of the second end is greater than the height of the first end.

9. An herb stripping device comprising:
   a handle having a first end, a second end, a curved top surface extending between the first end and the second end, and a curved bottom surface extending between the first end and the second end; and
   a blade portion pivotally attached to the first end of the handle, wherein the blade portion is movable and, in a first position, extends substantially between the first end of the handle and the second end of the handle, wherein a top edge of the blade portion contacts the bottom surface of the handle, and wherein a bottom edge of the blade portion comprises a plurality of curved notches, each of the curved notches having at least one face for stripping herbs when an herb is moved through one of the plurality of curved notches.

10. The herb stripping device of claim 9, wherein the blade portion is movable, around the pivot, to at least a second position that is 180 degrees from the first position.

11. The herb stripping device of claim 10, wherein the bottom surface of the handle comprises a cavity and wherein the blade portion, when in the first position, recessing into the curved bottom surface via the cavity.

12. The herb stripping device of claim 9, wherein the curved notches progressively increase in width along the blade portion.

13. The herb stripping device of claim 9, wherein the curved notches have varying heights.

14. The herb stripping device of claim 9, wherein the curved notches span less than half the blade portion.

15. The herb stripping device of claim 9, wherein at least a portion of the bottom edge of the blade portion is sharpened.

16. The herb stripping deice of claim 15, wherein the curved notches span less than half the blade portion and wherein the at least a portion of the bottom edge of the blade portion being sharpened comprises a portion of the bottom edge of the blade portion not having the curved notches.

17. The herb stripping device of claim 9, wherein the top surface of the handle and the curved bottom surface of the handle meet at a point to form the first end of the handle.

18. The herb stripping device of claim 17, wherein the second end of the handle is formed by a curved sidewall connecting the top surface and the bottom surface, and the height of the second end is greater than the height of the first end.

* * * * *